Figure 1:
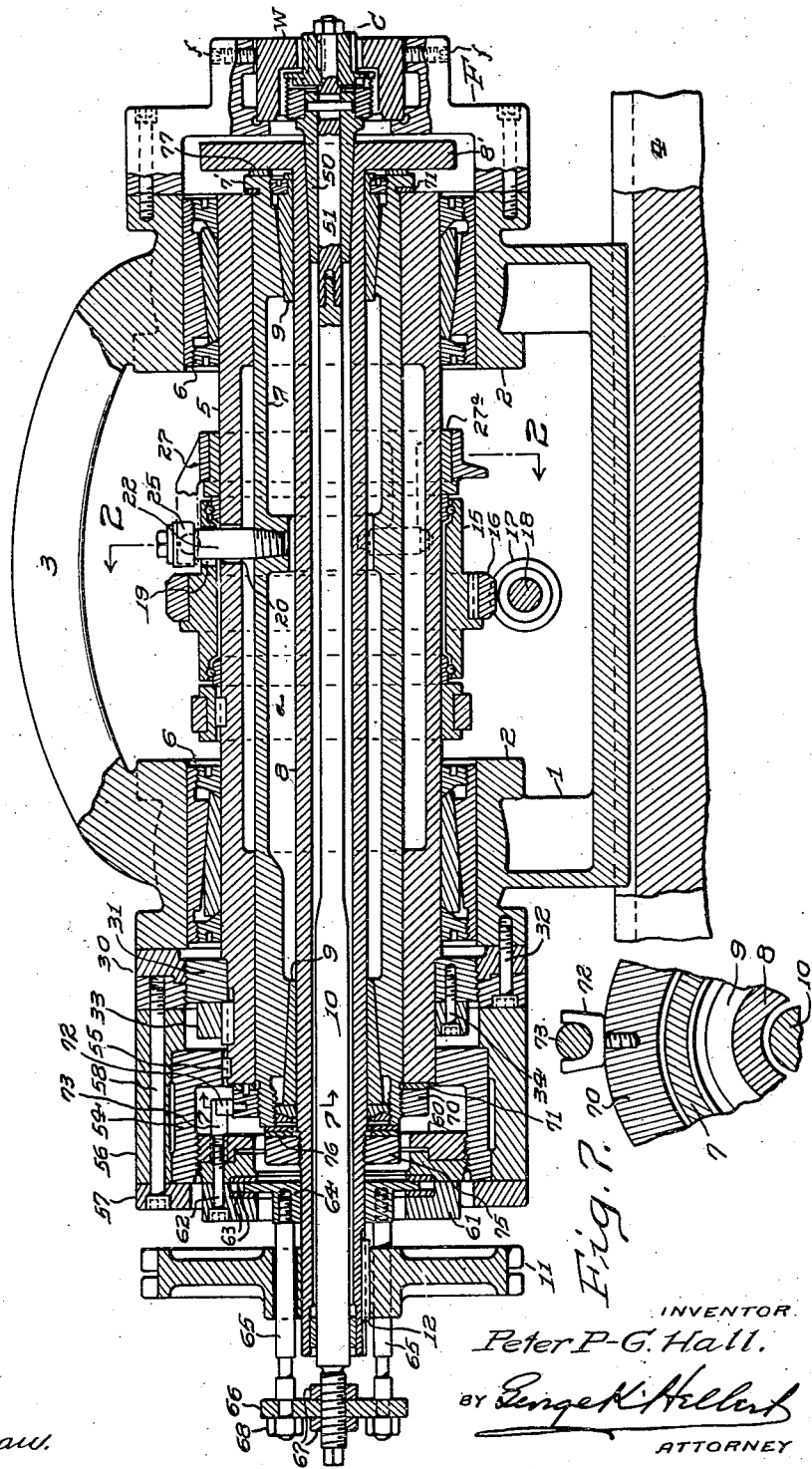

July 23, 1935.  P. P-G. HALL  2,008,757
MILLING MACHINE
Filed July 8, 1933  3 Sheets-Sheet 1

INVENTOR.
Peter P-G. Hall.
BY
ATTORNEY

WITNESS

July 23, 1935.                P. P-G. HALL                 2,008,757
                             MILLING MACHINE
                           Filed July 8, 1933           3 Sheets-Sheet 2

INVENTOR
Peter P-G. Hall.

Patented July 23, 1935

2,008,757

UNITED STATES PATENT OFFICE 2,008,757

MILLING MACHINE

Peter P-G. Hall, Philadelphia, Pa.

Application July 8, 1933, Serial No. 679,479

12 Claims. (Cl. 10—154)

The principal object of this invention is the provision of a novel form of milling machine through the medium of which the machining of many machine parts and the like which has hitherto been possible only with the expenditure of much time and labor can be accomplished rapidly, accurately and economically.

Further objects of the invention as well as advantages and novel features of design, construction and arrangement comprehended thereby are hereinafter more particularly pointed out or will be apparent to those skilled in the art from the following description of a machine constructed in accordance therewith as illustrated in the accompanying drawings.

This machine is of the "production" type, that is, it is intended to be set up and adjusted for the production of a large number of similar pieces before it is re-set up and adjusted for the production of other pieces of different design. It therefore finds wide application in the automotive and other industries in which very large numbers of similar parts are frequently required and special machinery installed for making them.

In certain aspects, the machine may be regarded as an adaptation of the planetary metal working machine disclosed in U. S. Patent 1,316,718, granted to me September 23, 1919, for in carrying out the present invention I prefer to make use of a machine of that general character in combination with certain additional mechanism and with suitable modifications in various particulars as will hereinafter be more fully explained.

As will appear by reference to the said patent, a machine constructed in accordance with the invention thereof is operative, among other things, to simultaneously impart to a suitable cutter a rotative movement about its own axis, a planetary movement about a stationarily supported work piece, and a longitudinal movement with respect to the latter whereby, when the cutter is provided with teeth having the profile of a given thread but without pitch, a helical thread having a corresponding profile may be produced in the work.

In Patent 1,507,235, granted to me September 2, 1924, there is disclosed a machine of the general character of that of my said earlier patent but provided, additionally, with means for imparting to the cutter a gradual radial movement with respect to the work piece in addition to the other movements to which I have referred so as to thereby produce in the work piece a tapered helical thread as distinguished from a straight helical one by compensating for the progressive variation in the radial magnitude of such thread.

While the machine of the present invention may be equipped with means for imparting this gradual radial movement to the cutter in case it be desired to form, among other things, a tapered thread in the work piece, under usual conditions the machining operations to which the present machine particularly lends itself are designed for the production of straight threads, cylindrical unthreaded surfaces and/or flat surfaces; consequently, the machine I have chosen to illustrate, to which reference is herein more particularly made, is devoid of the means required for the production of a tapered thread although it may be readily equipped therewith in accordance with the teachings of my said Patent 1,507,235 if desired.

By suitable adaptation and arrangement, the machine of the present invention may be employed for the performance of a wide range of machining operations as will be readily apparent to those skilled in the art when familiar with the basic principles of the invention as hereinafter explained, and may therefore be utilized for the rapid, accurate and economical production of numerous machine parts and the like of different designs. Consequently, by way of example only and as typical of one class of work which can be performed by the machine but not by way of limitation or restriction of the range of work for which it may be employed by suitable adjustment of its elements and/or through the medium of the various types of cutters and/or other elements operatively associated with it, I shall herein refer more particularly to the employment of the machine for simultaneously performing three major and distinct operations on a single work piece having an axial bore of two diameters extending through it, namely, the operations of forming a thread in the larger bore adjacent one end of the work piece, truing up the plain bore of smaller diameter adjacent the opposite end of the piece, and forming an undercut groove between the threaded and unthreaded bores of greater diameter than the former, these three operations being performed contemporaneously in a little more than a single revolution of the cutter about the interior of the work. It will be readily appreciated that hitherto the performance of these three operations would normally have been done separately through the medium of different cutting tools and/or machine tools, whereas by means of the present machine they can be performed conjointly after the work piece is properly chucked, thus insuring, among other things, accurate alignment of the various machined surfaces as well as an enormous saving in the time required for finishing the piece with resulting commensurate reduction in its production cost.

Figure 2:
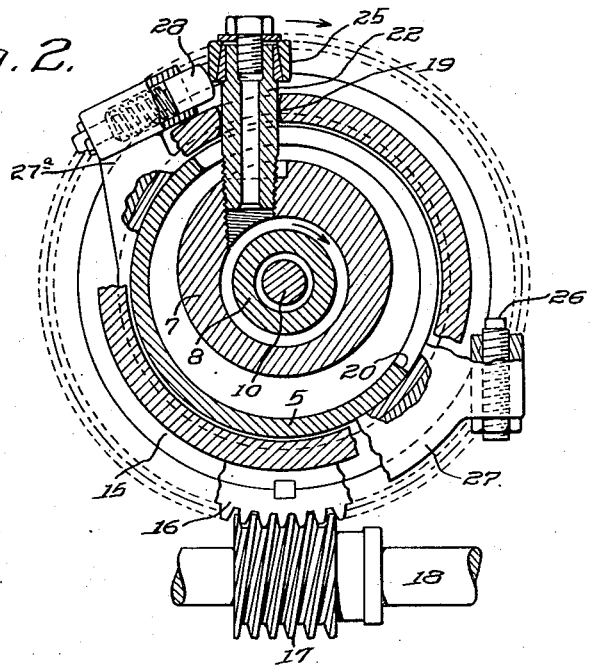
Figure 3:
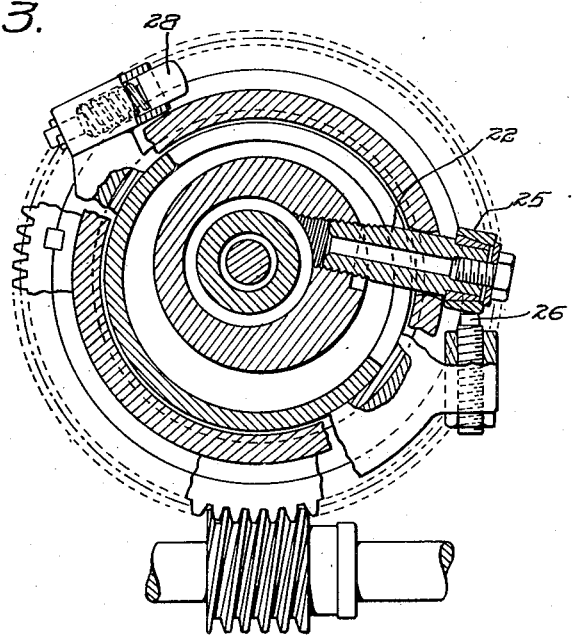
Figure 4:
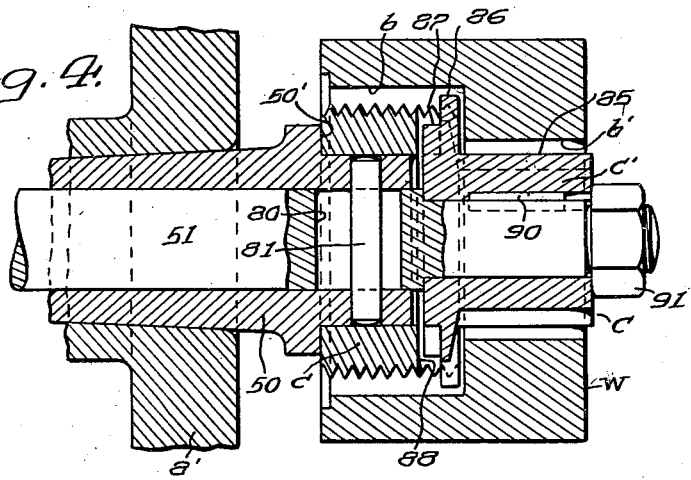
Figure 5:
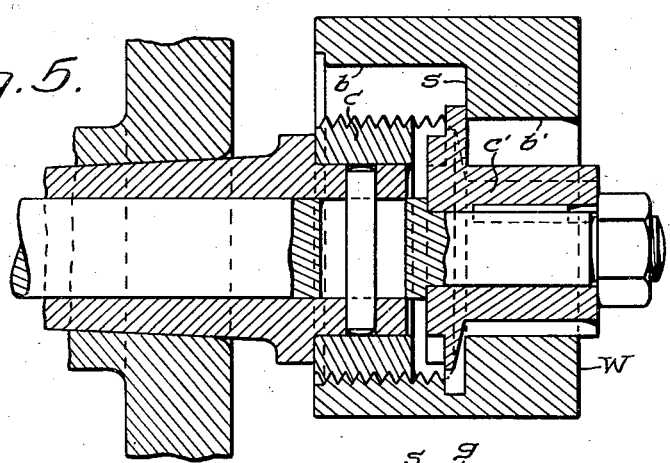
Figure 6:
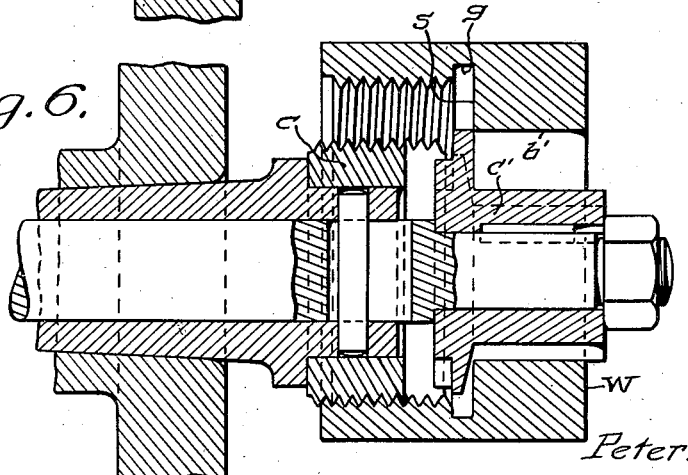

In the accompanying drawings, Fig. 1 is a longitudinal central section, with certain parts shown in elevation, of the machine patented in my said Patent 1,316,718 having combined and associated therewith certain additional mechanism and embodying certain modifications in accordance with the present invention; Fig. 2 is a transverse staggered section substantially on the line 2—2 in Fig. 1 looking in the direction of the arrows but on a considerably enlarged scale, this figure showing the parts in the position they occupy at the initiation of the operating cycle, while Fig. 3 is a similar view showing the parts in the position which they occupy after the cutter has been brought in to depth preparatory to its movement about the work piece in a planetary orbit; Fig. 4 is an enlarged fragmentary, central longitudinal section showing the work piece, cutter and adjacent parts with the cutter in the position it occupies at the commencement of the operating cycle; Fig. 5 is a similar view showing the cutter after it has been moved in to depth but before its true planetary movement has been initiated, while Fig. 6 is a similar view showing the cutter after it has completed its said movement and is thus ready to be moved out of depth preparatory to its being returned to final position to thereby complete the operating cycle. Fig. 7 is a fragmentary detail view principally in transverse section but on a scale considerably larger than Fig. 1 taken on line 7—7 of said figure. Throughout the drawings like characters of reference are used to designate the same parts.

To enable those skilled in the art to comprehend and practise the present invention, I shall first very briefly describe the principal features of construction and operation of the patented planetary milling machine to which I have hereinbefore referred, and shall then point out with greater particularity the modifications which I make therein and the details of the additional mechanism which I combine therewith to thereby produce the machine of the present invention.

In its commercial embodiment, the said machine comprises among other things a unitary frame 1, provided with cylindrical horizontally aligned longitudinally spaced housings 2, 2 tied together by a yoke 3 and suitably mounted on a base 4. Extending through the housings is a hollow cylindrical main container 5 rotatably supported on bearings generally designated as 6, which are preferably, as shown, of the split bushing type to enable accurate initial adjustment and subsequent compensation for any wear which may take place, as it is necessary for the production of accurate work that all play or lost motion shall be eliminated as far as possible from these bearings. Within and extending from one end to the other of the main container is a hollow secondary container 7 which eccentrically mounted for limited rotative movement within the main container as best shown in Figs. 2 and 3 and, in turn, surrounds the longitudinally extending cutter spindle 8 which is journaled for axial rotation in the secondary container on adjustable bearings generally designated as 9 and preferably of the split bushing type so that any wear or lost motion between the spindle and the secondary container may be readily taken up. This cutter spindle is made hollow and within it, in accordance with the present invention, is disposed an auxiliary cutter spindle 10 hereinafter more particularly described. The cutter spindle 8 is driven in any suitable way as through the medium of a gear 11 mounted on its rear end driven by a silent chain or the like forming part of suitable driving mechanism (not shown) or, if desired, the spindle may be driven by a belt in which case the gear is replaced by a pulley. These parts are connected by a key 12 or otherwise arranged so that the spindle will rotate unitarily with but can slide longitudinally through the gear which thus constantly remains in the same vertical plane as its driving pinion.

Between the housings 2 the main container is surrounded by a rotatable sleeve 15 suitably prevented from longitudinal movement relatively to the container and desirably mounted on ball bearings as shown in Fig. 1. Mounted upon and keyed to this sleeve is a worm gear 16 which meshes with a worm 17 on a shaft 18 extending transversely of the machine below the main container, a gear train and/or other mechanism (not shown) being provided for driving the shaft so as to effect rotation of the worm gear 16 and sleeve 15 in either direction as and when required.

The sleeve 15 is provided with a generally radially directed hole 19 and the main container with a peripheral slot 20 aligned therewith, and through this hole and slot is extended a driving stud 22 whose inner end is threaded into the secondary container 7. Thus, as the worm gear 16 is turned in one direction or the other, the driving stud 22 and secondary container 7 are constrained to move with the sleeve through coaction of the driving stud with the wall of the hole 19 through which it extends, but as long as the movement of the studs does not exceed the length of the slot 20, the main container is unaffected and remains stationary.

At its outer extremity the stud is provided with a head 25 conveniently in the form of a roll or block adapted to engage a stop 26 carried on a band 27 surrounding the main container and adapted for rotative adjustment with respect thereto, suitable means (not shown) being provided for clamping the band in any desired position with respect to the container so that the stop, band and container will then form an operatively rigid unit.

Thus, when the shaft 18 is rotated so as to turn the worm gear 16 in a clockwise direction when the machine is viewed from its right hand or front end as shown in Fig. 1, an initial rotative movement will be imparted by the sleeve 15 and drive stud 22 to the secondary container 7, this movement being operative through the eccentric mounting of the secondary container in the main container to cause the cutter which, as hereinafter described, is supported adjacent the front ends of the cutter spindles 8, 10, to be moved eccentrically toward the work piece until the head 25 on the drive stud engages the stop 26. The length of the arc through which the stud 22 moves before it contacts the stop is of course determined by the position of rotative adjustment of the latter through the medium of the band 27 supplemented by adjustment of the stop itself if, as shown, it is made in the form of a screw threaded into a boss on the band, and is so gauged that the head 25 will contact the stop just as the cutter attains full operative depth in the work. Thereafter, through the medium of the driving stud 22, the main and secondary containers move unitarily so as to carry the cutter about the work in a planetary orbit and in the same relation thereto, i. e., at the same depth of cut as that to which it was brought by the partial revolution of the secondary container in the main container before the latter started to revolve.

At the completion of this planetary movement the direction of rotation of shaft 18 is reversed, preferably automatically through the medium of suitable mechanism (not shown). This, of course, correspondingly reverses the direction of rotation of gear 16 and sleeve 15 so as to move the head 25 of the driving stud away from stop 26 and toward a return stop 28 carried by an inner band 27ª, and desirably of a cushion type as shown in Figs. 2 and 3, which is so disposed with relation to the band that head 25 will contact therewith prior to stud 22 reaching the adjacent end of slot 20. During this movement of the stud from stop 26 (Fig. 3) to stop 28 (Fig. 2) which is in the direction opposite to the arrow in Fig. 2, the main container of course remains stationary and the secondary container turns eccentrically within it. However, as soon as contact between head 25 and stop 28 is established, the main and the secondary containers move unitarily in reverse direction desirably for a little more than a full revolution so as to return all the parts to the position they occupied at the initiation of the operative cycle. Where the rotative speed of shaft 18 is increased, as is desirable, after its reversal of direction, a quick return of the parts to initial position is thus effected with corresponding saving of time, but of course if preferred the parts may be returned at the same rate at which they were moved during the earlier part of the cycle.

The machine is also provided with suitable means for imparting to the cutter during its planetary movement about the work a progressive longitudinal movement parallel to the axis of the latter so that when the cutter is provided with teeth having the profile of a desired thread but without pitch, a helical thread of corresponding profile will be formed in the work. For effecting this progressive longitudinal movement of the cutter with respect to the work simultaneously with its planetary movement thereabout as hitherto described, the machine is therefore provided with a master nut 30, desirably made in two parts as shown in Fig. 1, so as to facilitate compensation for any wear which may occur between its thread and those of an annular master screw 31 cooperative therewith which is supported on and suitably prevented from rotation with respect to the rear end of the main container, the master nut in turn being rigidly secured to the outer face of the rear housing 2, conveniently by means of bolts 32 annularly spaced about the nut. The latter abuts against a shoulder formed on the container by reducing the diameter of its extremity and is held in place by a collar 33 keyed to the container and bolted to the nut by annularly spaced bolts 34; the nut and the master screw are thus readily removable for interchange with others of different pitch when desired. Consequently when the main container is rotated, it is also moved longitudinally through the coaction of the screw and nut at a rate determined by the pitch of their cooperative threads which of course corresponds to the pitch of the thread desired in the work.

I shall now refer more particularly to the modifications which I incorporate in and the additional mechanism which I combine with a machine of the general character of that to which I have referred in order to form the milling machine of the present invention.

As hitherto stated, the main cutter spindle 8 is made hollow and encloses the auxiliary cutter spindle 10. As shown, the main spindle is provided at its front end with a face plate 8' and is tapered inwardly therefrom for a suitable distance to receive the correspondingly externally tapered cutter arbor 50 which is in turn axially bored for the reception of a stem 51 removably interconnected with the front end of the auxiliary spindle, conveniently by means of cooperative threads formed in a bore at the rear end of the stem and on the front end of the spindle which is suitably reduced in diameter, so that after the arbor is inserted in the main spindle and the stem pushed through the bore in the former, the auxiliary spindle can be connected with the stem by screwing it in from the rear end of the machine.

It will be understood that under normal conditions of operation the auxiliary spindle 10 and main spindle 8 rotate unitarily about a common axis but are, under some conditions, moved longitudinally with relation to each other through the medium of suitable means provided for that purpose. In their preferred form and as shown, the said means comprise an auxiliary master nut and an auxiliary master screw which cooperate in effecting longitudinal movement of the auxiliary spindle with respect to the main spindle in a manner somewhat similar to that in which the master nut 30 and master screw 31 cooperate in effecting movement of the main container and associated parts relatively to the main housings and frame of the machine. More particularly, the master nut 54 comprises an annular portion provided with internal threads of suitable pitch adjacent its rear or outer end and an inwardly directed annular flange at its front or inner end which seats slidably on the rear end of the main container and is connected therewith by a key 55 so that while the nut turns with the container at all times, the parts can move longitudinally with respect to each other. The nut is enclosed in a sleeve 56 in which it can freely rotate and is held therein by a collar 57 seating against the rear ends of the sleeve and nut and held in place by annularly spaced bolts 58 extending forwardly into the master nut 30 which, in turn, is operatively fixed to the rear housing 2 as hitherto described. Thus, nut 30, sleeve 56, and collar 57 are stationary at all times when the machine is in operation although the auxiliary master nut 54 can turn within the sleeve in correspondance with the rotative movements of the main container 5.

The auxiliary master screw 60, also desirably made in two parts to facilitate compensation for wear, is disposed in the rear end of nut 54 with its external thread in cooperative engagement with the internal thread in the latter, and against its rear face is seated a ring 61, annularly spaced bolts 62 extending through the ring and nut serving to hold the parts together. The adjacent faces of the ring and nut are chamfered annularly inside the bolt to receive a pair of longitudinally spaced bearing rings 63 of fibre or other suitable material between which is extended the marginal edge of a radial flange integral with a collar 64 seating on the rear end of the main spindle 8; from the hub portion of this collar annularly spaced studs 65 project rearwardly through suitable holes in gear 11 and in a yoke 66 threaded onto the rear end of the auxiliary spindle 10. Lock nuts 67 are located on the spindle on opposite sides of the yoke and retaining nuts 68 on the ends of the studs 65 so as to hold the yoke firmly to the latter. Thus, the driving pinion is effective to turn not only the main cutter spindle but also, correspondingly, the auxiliary spindle 10 through the medium of the studs 65 and yoke 66 while the auxiliary spindle is capable of relative longitudinal movement with respect to the main spindle when the auxiliary master screw 60 is rotated in the stationarily held nut 54, the direction of this movement being of course determined by the direction of rotation of the screw in the nut.

A collar 70 is threaded onto the rear end of the secondary container, which is projected sufficiently for the purpose beyond the corresponding end of the main container, the primary duty of this collar being to hold the secondary container in proper longitudinal relation with the main container by drawing a peripheral flange 7' at the front end of the former against the corresponding end of the latter, washers 71 of fibre or other suitable material being preferably inserted between the ends of the containers, the flange 7' and nut 70 respectively. This nut is conveniently utilized as a portion of the driving means provided for turning the auxiliary master screw 60 in correspondence with the rotation movements of the secondary container to thereby effect the longitudinal movement of the auxiliary spindle to which reference has just been made; to this end, there is secured to the collar in any suitable way a radially extending fork 72 adapted to receive the end of a stud 73 extending from the master screw 60 in such manner that whenever the secondary container is turned in either direction a corresponding movement will be imparted to the master screw.

A collar 75, threaded on the main spindle 8, bearing against fibre or other washers 76 interposed between it and the end of the secondary container is operative to hold the spindle in fixed longitudinal relation to the secondary container by drawing the face plate 8' against a washer 77 interposed between it and the flange 7' when the collar is set up against the washers 76, any suitable means (not shown) being provided for preventing the collars 70, 75 from backing off once they are adjusted to proper position.

Depending on the particular character of the machining operations to be performed on the work piece, numerous types and styles of cutters can be associated with the forward end of the main and auxiliary cutter spindles, and as typical of one class of cutters which may be employed, I have illustrated one having relatively movable interfitting elements. This cutter is designed when properly actuated by a machine of the general character of that hereinbefore described to operate on a work piece or blank W having an axial bore of two diameters so as to simultaneously form a helical thread in the larger bore $b$, true up the smaller bore $b'$, and cut an annular groove $g$ of greater diameter than either of said bores adjacent the inner end of the thread during a single operative cycle of the machine.

More particularly, this cutter generally designated as C and best shown in Figs. 4, 5 and 6, embodies the relatively movable interfitting elements $c, c'$. The element $c$ comprises an annulus of proper internal diameter to seat over the outer end of the cutter arbor 50, which is formed with a shoulder 50' against which the inner end of the element abuts, provided on its outer surface with threads having the profile of the thread desired in the work piece but without pitch. The front end of the auxiliary spindle stem 51 projects through the arbor and is transversely slotted as at 80, and a pin 81 is passed diametrically through the front end of the arbor and this slot before the cutter element is seated on the former so as to prevent the stem from unscrewing from the spindle 10 though allowing the stem to move longitudinally relative to the arbor and the main spindle. Beyond the slot, the outer end of the stem is reduced in diameter to form a seat for the other cutter element $c'$ which comprises a portion 85 adapted to act on the bore $b'$, another portion 86 adapted to form the undercut groove $g$, and a base portion 87 adapted to fit into one or more slots 88 formed in the front face of the threaded element $c$. This portion of the cutter is constrained to rotate with the auxiliary spindle by a key 90 and is held in position on the spindle by a lock nut 91 threaded onto its outer end. Both elements of the cutter are of course provided in the customary way with longitudinally extending or other suitably positioned flutes (not shown) so as to form annularly spaced cutting teeth on the periphery of the element $c'$ and also on the periphery of the threaded element $c$ to thereby adapt the cutter for the removal of metal from the interior of the work piece in accordance with the usual or any desired milling practice. If the shoulder $s$ in the work piece is also to be faced off, the portion 86 of element $c'$ may also be provided with teeth on its front face. Since the particular construction and arrangement of the cutter teeth as well as the general design of the cutter as a whole are a matter of choice and are largely determined by the particular character of the work piece which is to be machined, and as the manufacture of milling cutters of various forms is well understood, it is believed that a more specific description of the particular cutter which I have chosen to illustrate would be superfluous as long as it is understood that one element, for example $c$ thereof, is carried on the arbor 50 and the other upon the auxiliary spindle stem 51; that both said elements are constrained to rotate about the common axis of the cutter spindles, and that through relative longitudinal movement of the spindles the elements of the cutter can be brought together as shown in Fig. 4 and gradually separated to substantially the position shown in Fig. 5 or vice versa.

*Operation*

The work piece W is brought to the machine with the bores $b, b'$ already formed therein, it being of course understood that the particular work piece illustrated is to be considered as merely typical. It is then clamped in fixed relation to the machine through the medium of a suitable fixture which may be of any type adapted to center the work piece with its preformed bores substantially coaxial with the cutter spindles when the driving stud 22 is in the position shown in Figs. 1 and 2, that is, against the return stop and the machine thus in condition for the initiation of its operative cycle. The particular arrangement and construction of the fixture for holding the work are matters of choice and are, of course, usually dictated by the particular character of the latter; in Fig. 1 is therefore shown a typical fixture comprising a generally annular housing F bolted to the front face of the housing 2 and provided with a central aperture for the reception of the work and screws $f$ for holding the latter in position, but under usual conditions the fixture is a somewhat more complicated device adapted to automatically or substantially automatically center and chuck the work in a minimum of time substantially concentric with the axis of the spindles and the cutter.

While the work is being centered and chucked, the cutter elements occupy the position shown in Fig. 4 in which, it will be noted, there is not only a clearance between the periphery of the cutter and the work but also between the front face of the groove forming portion 86 of the cutter and the shoulder $s$ between the two bores in the latter. In the drawings, the work piece is shown as having a small chamfer or countersink adjacent the mouth of the bore $b$, but the machining operations may be performed equally well irrespective of the presence or absence thereof.

The spindle driving gear 11 is now set in motion, thus causing both spindles with their respectively attached cutter elements to rotate about their common axis; normally, the spindles are kept rotating continuously while the work pieces are being consecutively fed to and removed from the fixture instead of being started and stopped before and after each operative cycle while the machined piece is being removed from the fixture and the next unmachined piece adjusted therein, but for the purposes of the present description it will be assumed that the work is chucked while the spindles are at rest. Since the cutters are as yet entirely out of contact with the work, they merely run idle as long as shaft 18 is stationary, but when this shaft is now set in motion, the secondary container at once begins to turn slowly in the still stationary main container with resulting movement of the cutter eccentrically toward the work. Simultaneously therewith, the auxiliary spindle 10 and interconnected cutter element $c'$ are fed gradually forward as the secondary container carries collar 70 and fork 72 around with it and correspondingly, through the medium of stud 73, turns master screw 60 in the now stationary auxiliary master nut 54 with resulting movement of the front face of portion 86 of the cutter toward the shoulder $s$ between bores $b$, $b'$ of the work piece. The amount of eccentric movement of the cutter as a whole and the longitudinal travel of the cutter element $c'$ are so determined by suitable adjustment of the machine with respect to the position of the work that the said face of the cutter will meet the shoulder $s$ substantially as the peripheral teeth of the cutter are brought to full depth in the surfaces of $b$, $b'$, or if the face portion 86 of element $c'$ is provided with teeth and thus adapted to face off the shoulder $s$, the adjustment of the parts should be such that the desired depth of cut to be taken from the shoulder will be attained substantially as the peripheral teeth attain full depth in said surfaces. This attainment of full cutting depth should also occur just as the head 25 of the driving stud engages stop 26 and thereby operatively couples the main and secondary containers so that they thereafter move as a unit to carry the cutter, now in to full cutting depth, about the work in a planetary orbit for, preferably, a little more than a full revolution from the point at which it was brought to depth in order to insure a complete full depth cut around the inner periphery of the work.

As soon, however, as the main container commences its turning movement, relative rotation between auxiliary master screw 60 and auxiliary master nut 54 can no longer take place for as the former is driven from the secondary container and the latter supported on the main container and rotates therewith, the coupling of the two containers temporarily negatives this possibility; as a result, there is an immediate cessation of longitudinal movement of the auxiliary cutter spindle 10 and cutter element $c'$, the portion 86 of which, designed to form the undercut groove $g$ in the work piece, being now aligned with that part of the latter in which the groove is to be formed as shown in Fig. 5.

However, as the cutter is thereafter carried around the work in its planetary path, the main and the secondary containers as well as the main cutter spindle and cutter element $c$, are moved longitudinally relative to the auxiliary spindle and the work through coaction of the main master nut 30 and master screw 31 as long as the main and secondary containers continue their unitary turning movement and for a distance at least equal to the pitch of one thread to thereby form a helical thread in the bore $b$; if the element $c$ is of sufficient length, but a little more than a full turn of the cutter about the work is required for forming the entire length of thread, but if the element is of insufficient length for the purpose more than one complete planetary movement of it about the work may be required. Ordinarily, the pitch of the cooperative threads of this nut and screw is arranged in such direction that the cutter element will be moved rearwardly, that is, toward the mouth of the bore $b$ although under some conditions it may be arranged to move the element in the opposite direction with respect to the work.

The bore $b'$ has now been brought to size, the groove $g$ fully formed, the shoulder $s$ faced, assuming the cutter is designed for that purpose, and the bore $b$ threaded, so it only remains to retract the cutter from the position shown in Fig. 6 and return the various parts to the position they occupy at the commencement of the operative cycle.

This return is effected, as previously indicated, by reversal of the direction of rotation of shaft 18, the primary result of which is to turn the secondary container in the opposite direction from that in which it previously turned until the head 25 of the driving stud contacts return stop 28, thereby coupling the secondary container to the main container so that the two containers will thereafter rotate as a unit. While the secondary container is thus turning independently of the main container, the cutter C as a whole is moved eccentrically away from the work and, simultaneously therewith, the cutter element $c'$ is moved longitudinally away from the work, that is, toward the left when viewed as in Fig. 1, by a reverse movement of the auxiliary master screw 60 which turns, under the influence of the secondary container, within the now stationary auxiliary master nut 54. This longitudinal movement of cutter element $c'$ clears the latter from shoulder $s$ of the work and carries it to the position shown in Fig. 4 which it attains just as the driving stud 22 picks up the main container. Thereafter, the ensuing unitary movement of the main and secondary containers not only returns them toward their initial position but also is effective to move the main cutter spindle 8 longitudinally to the right when viewed as in Fig. 1 through coaction of the master screw 31 and master nut 30, thereby closing the cutter element $c$ onto element $c'$ until the initial relation between these parts as shown in Fig. 4 is again established simultaneously with the containers reaching their initial position at which time further movement of shaft 18 is arrested. The operating cycle now being completed, the finished work piece can be removed from the fixture, and a succeeding unfinished piece substituted therefor preparatory to a repetition of the cycle.

Thus, in a single such cycle, three or, if desired, four separate machining operations have been performed on the work, namely, the finishing of bore b', the cutting of groove g, the threading of bore b and also, if desired, the facing off of the shoulder s. Obviously, since these several operations were conjointly performed through the medium of a single machine tool, concentricity of the threaded and unthreaded bores and groove g are insured as well as the location of the face of shoulder s in a plane exactly normal to the axis of the bores. But one chucking of the work is all that is required and the several machining operations thereafter performed upon it are carried on automatically if, as is usual, the driving mechanism for shaft 18 is arranged to reverse its direction of rotation at the proper time in the cycle.

Should it be desired to merely machine bores b, b' so as to provide true cylindrical surfaces therein instead of forming a thread in bore b and machining bore b', a cutter devoid of "no pitch" threads on element c would be employed instead of the particular cutter illustrated and the machine would then operate without any adjustment or rearrangement to form cylindrical surfaces in bore b, b' and the groove g and would also face off the shoulder s if the cutter were designed for the latter operation as hitherto explained. However, should the blank instead of having a chamfer at the open end of bore b be provided with a small inwardly overhanging flange, it might be impossible to move element c longitudinally during the machining operation without bringing it into engagement with the flange and perhaps cutting some of it away. Under these conditions, by substituting for the master screw 31 and nut 30 corresponding parts provided with cooperating grooves instead of helical threads on their interengaging surfaces and making element c of the cutter of sufficient length to machine the desired length of bore b between the shoulder s and the inwardly directed flange, the desired machining operations can be readily accomplished without affecting the flange in any way, for during the initial movement of the secondary container, the cutter element c will be moved into proper relation with the work and the cutter as a whole moved eccentrically in to depth in the manner already described, but thereafter, during the planetary movement of the cutter about the work, no longitudinal movement will be imparted to element c since both containers and the main cutter spindle are merely held in the same vertical plane by the cooperative grooves of the master screw 31 and nut 30 instead of being moved longitudinally as when these parts are supplied with helical threads. In a generally similar way, the machine can be arranged by utilization of a "no pitch" auxiliary master screw and nut so that the auxiliary spindle will be maintained longitudinally stationary during the operating cycle and the main spindle alone moved longitudinally through the medium of the helically threaded main master nut 30 and master screw 31, an adaptation which will frequently be found useful.

The examples just given are merely typical of various ways in which by the use of different master threads and nuts and/or by the use of different types of cutters, the machine may be utilized for machining many kinds of work pieces but since, as hitherto pointed out, the latter are always stationarily supported relatively to the machine and require to be chucked but once irrespective of how many separate portions thereof are to be acted upon during a single operating cycle, maximum economy of production and maximum accuracy are always possible irrespective of the particular design, nature or character of the work pieces.

Moreover, while in the machine hereinbefore described the main spindle 8 and auxiliary spindle 10 are rotated as a unit about their common axis so as to drive the cutter elements c, c' at the same speed, for certain classes of work it may be found desirable to drive them at different speeds and/or in opposite directions, and the machine may be readily arranged to accomplish this result. To this end, cutter elements of non-interengaging type are of course employed and respectively secured to the auxiliary spindle and the arbor 50 in any suitable way so as to rotate therewith, pin 81 being removed. Furthermore, instead of threading the rear end of the auxiliary spindle through yoke 66 and locking it thereto by nuts 67, the spindle is carried loosely through the yoke so it can revolve therein and, in lieu of the nuts, bearing collars are mounted on opposite sides of the yoke upon the spindle so as to restrain the latter from longitudinal movement in the yoke, while beyond the yoke a driving gear or pulley is disposed on the spindle and connected with suitable driving mechanism. Under these conditions, it is apparent the main and auxiliary spindles can be rotated independently either in the same or opposite directions and at the same or different speeds, the connection, if any, between the stem 51 and auxiliary spindle 10 being made of such character as to prevent the parts becoming separated when the auxiliary spindle is revolving, and that the requisite longitudinal movement of the latter with respect to the main spindle will be effected in substantially the same way as has been heretofore described.

While I have herein described and illustrated one form of machine constructed in accordance with my invention, it is not my intention to thereby confine or restrict myself specifically to any precise details of design, construction and arrangement of the various elements composed therein as they are susceptible of modification and alteration in numerous particulars without departing from the spirit and scope of the invention as defined in the appended claims.

Having thus described my invention, I claim and desire to protect by Letters Patent of the United States:

1. In a milling machine, the combination of a rotatable main container, a secondary container eccentrically mounted in the main container, a main cutter spindle rotatable within the secondary container, an auxiliary cutter spindle extending through the main spindle, means for rotating the spindles, and means for effecting longitudinal movement of the auxiliary spindle relatively to the main spindle while the spindles are rotating.

2. In a milling machine, the combination of a rotatable main container, a secondary container eccentrically mounted in the main container, a main cutter spindle rotatable within the secondary container, an auxiliary cutter spindle extending through the main spindle, means for rotating the spindles, and means for effecting relative axial movement between the spindles while they are rotating.

3. In a milling machine, the combination of a rotatable main container, a secondary container eccentrically mounted in the main container, a main cutter spindle rotatable within the secondary container, an auxiliary cutter spindle extending in the main spindle, means for simultaneously driving both spindles, means for moving one spindle axially in a predetermined direction relatively to the other spindle during relative rotary movement of the containers, and means for then effecting like movement of the latter spindle in the opposite direction with respect to the first spindle while both spindles are rotating and the containers are stationary with respect to each other.

4. In a milling machine, the combination of a rotatable main container, a secondary container eccentrically mounted in the main container, a main cutter spindle rotatable within the secondary container, an auxiliary cutter spindle extending in the main spindle, means for driving both spindles simultaneously, a cutter having relatively movable parts respectively carried by the spindles, means for revolving the secondary container in the main container through a limited arc to move the cutter into the work in a plane normal to the spindles and for then rotating both containers as a unit, means operative to move the auxiliary spindle longitudinally with respect to the main spindle during said limited movement of the secondary container to thereby move one part of the cutter into the work in a direction parallel to the spindles, and means operative to move both containers, the main cutter spindle and the other part of the cutter in the opposite direction with respect to the auxiliary spindle during the subsequent rotation of the containers.

5. In a milling machine, the combination of a rotatable main container, a secondary container eccentrically mounted in the main container, a main cutter spindle rotatable within the secondary container, an auxiliary cutter spindle extending in the main spindle, means for driving both spindles simultaneously, a cutter having relatively movable parts respectively carried by the spindles, means for revolving the secondary container in the main container through a limited arc to move the cutter as a whole into the work in a plane normal to the spindles and then rotating the main and secondary containers as a unit, a master screw and nut operative to move both containers, the main cutter spindle and one part of the cutter longitudinally in one direction while the containers are rotating as a unit, and an auxiliary master screw and nut operative to move the auxiliary cutter spindle and the other part of the cutter in the opposite direction with respect to the main cutter spindle during the prior limited movement of the secondary container in the main container.

6. In a milling machine, the combination of a supporting frame, a main container rotatable therein, a secondary container eccentrically rotatably mounted within the main container, a main cutter spindle extending through the secondary container and rotatable therein, an auxiliary cutter spindle extending within the main spindle, means operative to constrain said spindles to rotate unitarily but affording capacity for relative longitudinal movement therebetween, means for driving the spindles, means for turning the secondary container through a limited arc with respect to the main container and for thereafter turning both containers as a unit, a master screw carried by the main container, a master nut fixed to the frame cooperative therewith, an auxiliary master screw carried by the secondary container, an auxiliary master nut carried by the main container, rotatable therewith but capable of relative axial movement with respect thereto, and means interconnecting the auxiliary screw with the auxiliary spindle whereby when the secondary container turns relatively to the main container the auxiliary spindle is moved longitudinally with respect to the main spindle and when both containers turn unitarily the auxiliary spindle is maintained longitudinally stationary with respect to the frame but the main spindle is moved longitudinally with respect to the auxiliary spindle.

7. In a milling machine, the combination of a frame, a main container rotatably mounted therein, a secondary container eccentrically mounted for rotation in the main container, a main cutter spindle extending through and rotatable in the secondary container, an auxiliary cutter spindle within the main spindle, means for driving both spindles but affording capacity for limited relative axial movement therebetween, a cutter having relatively movable parts respectively carried by the spindles, means for turning the secondary container in the main container through a limited arc independently of the main container to move the cutter as a whole into the work in a plane normal to the spindles and for thereafter turning both containers as a unit, and means actuated from the secondary container during its said independent movement for effecting axial movement of the auxiliary spindle and one cutter part with respect to the main spindle and the other cutter part and the frame but inoperative to effect such movement during the combined rotation of the containers.

8. In a milling machine, the combination of a frame, a main container rotatably mounted therein, a secondary container eccentrically mounted for rotation in the main container, a main cutter spindle extending through and rotatable in the secondary container, an auxiliary cutter spindle within the main spindle, a milling cutter having independently movable elements respectively mounted adjacent the corresponding ends of the spindles, means for driving the spindles as a unit but affording capacity for limited axial movement therebetween, means for causing the secondary container to rotate independently of the main container through a limited arc and for thereafter causing both containers to rotate as a unit, means actuated from the secondary container during its said independent movement relatively to the main container for longitudinally moving the auxiliary spindle relatively to the frame and to the main spindle to thereby cause corresponding axial movement of one of the cutter elements through a predetermined distance, and means for then moving the containers and the main cutter spindle longitudinally in the opposite direction to correspondingly move the other cutter element axially while the first element remains longitudinally stationary with respect to the frame and the other element.

9. In a milling machine, the combination of a frame, a main container rotatably mounted therein, a secondary container eccentrically mounted for rotation in the main container, a main cutter spindle extending through and rotatable in the secondary container, an auxiliary cutter spindle within the main spindle, a milling cutter having independently movable elements respectively mounted adjacent the corresponding ends of the spindles, means for driving the spindles as a unit but affording capacity for limited axial movement therebetween, means for causing the secondary container to rotate independently of the main container through a limited arc and for thereafter causing both containers to rotate as a unit, means actuated from the secondary container during its said independent movement in the main container for longitudinally moving the auxiliary spindle relatively to the frame and the main spindle to thereby cause corresponding axial movement of one of the cutter elements through a predetermined distance relatively to the other cutter element, and means for then moving the containers and the main cutter spindle longitudinally in the opposite direction to correspondingly move the other cutter element axially relatively to the first element, said means for moving said spindles being respectively operative to return the cutter elements consecutively to initial position upon reversal of the direction of the rotative movements of the containers.

10. In a milling machine, a cutter having independently movable elements respectively adapted to operate on different portions of the work, a pair of spindles respectively supporting said elements, means for driving the spindles but affording capacity for limited longitudinal movement therebetween, means for moving the cutter eccentrically into the work from a position substantially coaxial therewith and for thereafter carrying the cutter about the work in a planetary orbit, and means for moving one of said spindles axially with respect to the other during the eccentric movement of the cutter to thereby correspondingly move one of the elements axially with respect to the work.

11. In a milling machine, a cutter having independently movable elements respectively adapted to operate on different portions of the work, a pair of spindles respectively supporting said elements, means for driving said spindles but affording capacity for limited axial movement therebetween, means for moving the cutter eccentrically into the work from a position substantially coaxial therewith and for thereafter carrying it about the work in a planetary orbit, means for moving one of said spindles axially with respect to the other during the eccentric movement of the cutter to thereby correspondingly move one of the cutter elements axially with respect to the work, means for then moving the other spindle axially with respect to the first moved spindle during the planetary movement of the cutter, and means for thereafter consecutively returning the spindles and their respective cutter elements to initial position.

12. In a milling machine, the combination of a pair of cutter spindles in coaxial telescopic relation, driving means therefor, a cutter having independently movable elements respectively supported from said spindles, a frame, a main container journaled therein, a secondary container eccentrically journaled in the main container and surrounding said spindles, means for turning the secondary container relatively to the main container to thereby carry the cutter eccentrically into the work, means for then rotating both containers as a unit to carry the cutter in a planetary orbit about the work, and means operative to effect axial movement of one of the spindles only simultaneously with the rotation of one of the containers.

PETER P-G. HALL.